US009772857B2

(12) United States Patent
Chen et al.

(10) Patent No.: US 9,772,857 B2
(45) Date of Patent: Sep. 26, 2017

(54) EXECUTING SUB-PROGRAMS STORED IN AN ON-CHIP MEMORY AND CHARGING A DEVICE VIA USB BEFORE ENUMERATION PROCESS

(71) Applicant: Huawei Technologies Co., Ltd., Shenzhen, Guangdong (CN)

(72) Inventors: Yingguo Chen, Shanghai (CN); Shilin Pan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 14/487,618

(22) Filed: Sep. 16, 2014

(65) Prior Publication Data

US 2015/0082015 A1 Mar. 19, 2015

(30) Foreign Application Priority Data

Sep. 16, 2013 (CN) .......................... 2013 1 0422967

(51) Int. Cl.
*G06F 1/26* (2006.01)
*G06F 9/44* (2006.01)

(52) U.S. Cl.
CPC .............. *G06F 9/4406* (2013.01); *G06F 1/26* (2013.01)

(58) Field of Classification Search
CPC ........ G06F 13/4295; G06F 1/26; G06F 1/263; G06F 1/266; G06F 9/4401; G06F 9/4406; G06F 9/4411
USPC ........................................................... 712/2
See application file for complete search history.

(56) References Cited

U.S. PATENT DOCUMENTS

| | | | | |
|---|---|---|---|---|
| 9,099,881 | B2* | 8/2015 | Kim ...................... | H02J 7/0052 |
| 2004/0164708 | A1* | 8/2004 | Veselic ................. | H02J 7/0068 320/132 |
| 2004/0239294 | A1* | 12/2004 | Veselic .................. | G06F 1/266 320/155 |
| 2008/0126594 | A1* | 5/2008 | Monks .................... | G06F 1/266 710/17 |
| 2009/0009140 | A1* | 1/2009 | Kim ........................ | H02J 7/045 320/139 |

(Continued)

FOREIGN PATENT DOCUMENTS

| CN | 1801831 A | 7/2006 |
|---|---|---|
| CN | 101431241 A | 5/2009 |

(Continued)

*Primary Examiner* — Thomas Lee
*Assistant Examiner* — Santosh R Poudel (57) ABSTRACT

The present invention discloses a low-power startup method and a user equipment. The method includes: running, by a user equipment UE, a first subprogram in a boot load program bootloader, so as to determine whether the UE is charged through a universal serial bus interface USB; if the UE is charged through the USB and battery power is lower than a starting threshold, initializing, by the UE, the USB; when the USB successfully enumerates the UE, running, by the UE, a second subprogram in the bootloader to initialize an off-chip random memory in the UE; running, by the UE, a third subprogram in the bootloader to read a system mirror from an off-chip flash memory in the UE and load the system mirror to the off-chip random memory; and running, by the UE, the system mirror to complete a startup.

12 Claims, 5 Drawing Sheets

(56) References Cited

U.S. PATENT DOCUMENTS

| | | | | |
|---|---|---|---|---|
| 2012/0030381 A1* | 2/2012 | Singh | ............... | G06F 1/3206 710/16 |
| 2012/0030454 A1* | 2/2012 | Book | ............ | G06F 13/4081 713/2 |
| 2012/0054378 A1* | 3/2012 | Malamant | ......... | G06F 13/4295 710/19 |
| 2012/0185684 A1* | 7/2012 | Lee | ............ | G06F 1/263 713/2 |
| 2012/0274269 A1* | 11/2012 | Ohkuma | ............ | H02J 7/047 320/107 |
| 2013/0073777 A1* | 3/2013 | Monks | ............ | G06F 13/4291 710/316 |
| 2013/0082662 A1* | 4/2013 | Carr | ............ | H02J 7/0052 320/134 |
| 2013/0200857 A1* | 8/2013 | Kim | ............ | H02J 7/0052 320/162 |
| 2014/0075169 A1* | 3/2014 | Andrews | ............ | G06F 9/4416 713/2 |
| 2015/0172054 A1* | 6/2015 | Prakash | ............ | G06F 21/44 713/189 |

FOREIGN PATENT DOCUMENTS

| | | | |
|---|---|---|---|
| CN | 101989749 | A | 3/2011 |
| CN | 102055034 | A | 5/2011 |
| CN | 103154922 | A | 6/2013 |

* cited by examiner

EXECUTING SUB-PROGRAMS STORED IN AN ON-CHIP MEMORY AND CHARGING A DEVICE VIA USB BEFORE ENUMERATION PROCESS

CROSS-REFERENCE TO RELATED APPLICATION

This application claims priority to Chinese Patent Application No. 201310422967.4, filed on Sep. 16, 2013, which is hereby incorporated by reference in its entirety.

TECHNICAL FIELD

The present invention relates to the field of electronic technologies, and in particular, to a low-power startup method and a user equipment.

BACKGROUND

Multi-core smartphones already become a new trend in the mobile phone market. At present, relatively prevailing smartphones have 4 cores, and in the future, smartphones with 8 cores or even more cores will come out. Because a multi-core smartphone supports functions such as network access, movie and television, and entertainments, a user spends much more time in using a multi-core smartphone than using a single-function mobile phone. Accordingly, power consumption of the multi-core mobile phone may gradually increase, so that battery power of the multi-core mobile phone may be easily exhausted during use.

Generally, a mobile phone is charged by using a dedicated charger. However, the mobile phone may also be charged by a laptop computer through a USB (Universal Serial Bus, universal serial bus) interface. According to charging specifications for a USB2.0 interface, when a USB interface is not in a suspended state, a USB interface of a laptop computer may supply a 100 mA current to a device as long as the device is connected to the laptop computer through the USB interface. Generally, a user hopes that a mobile phone can support a charging scenario: When the mobile phone is in a power-off state due to low power, the mobile phone is connected to a laptop computer through a USB and the laptop computer supplies power to the mobile phone, so that the mobile phone can normally start during charging.

Figure 1A:
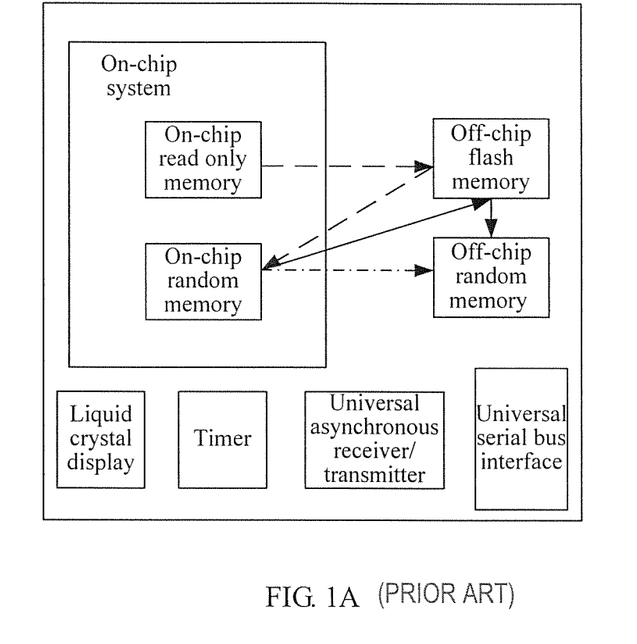
FIG. 1A is a schematic diagram of an implementation process of solution 1 in the prior art.

For the foregoing charging scenario, the prior art provides the following solutions:

In solution 1, as shown in FIG. 1A, a starting procedure of a mobile phone after being powered on includes the following steps:

① Run a boot program in an on-chip read only memory, so as to read a bootloader program from an off-chip flash memory and load the bootloader program to an on-chip random memory.

② Run the bootloader program in the on-chip random memory to initialize an off-chip random memory.

③ Run the bootloader program in the on-chip random memory, so as to read a system mirror from the off-chip flash memory, for example, a mainstream Android mirror, and load the system mirror to the off-chip random memory.

④ Run the system mirror in the off-chip random memory.

In the foregoing starting procedure, peripheral devices such as a Timer, a UART, and an LCD may also be used. A USB is used only when the system mirror runs and the mobile phone is already in a power-on state.

This solution has the following disadvantages:

Because, in a process of reading the system mirror from the off-chip flash memory to the off-chip random memory, both the off-chip flash memory and the off-chip random memory need to be accessed, power consumption of the mobile phone may be high. However, a 100 mA current supplied by the USB interface of the laptop computer generally cannot satisfy the power consumption of the mobile phone. Therefore, when a charging current of 100 mA from the USB cannot meet a power consumption demand of the mobile phone, the startup process of the mobile phone cannot be completed by using the current supplied by the USB. As a result, the mobile phone fails to start, thereby affecting use of the user.

Figure 1B:
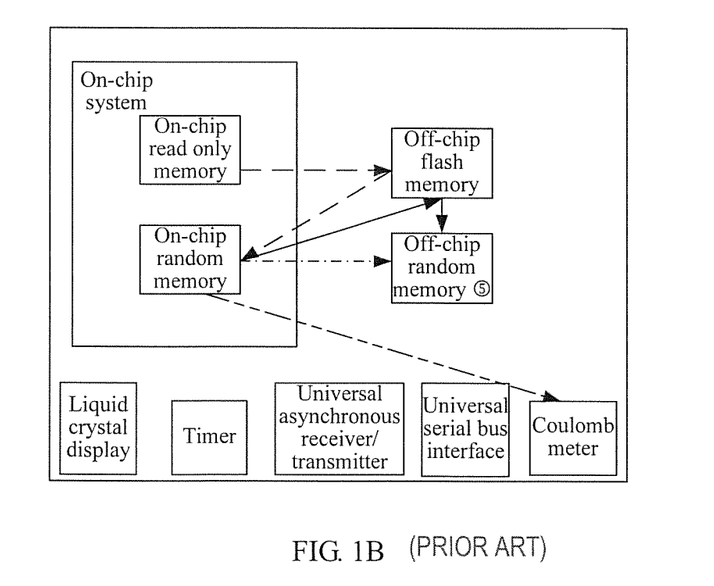
FIG. 1B is a schematic diagram of an implementation process of solution 2 in the prior art.

In solution 2, as shown in FIG. 1B, a starting procedure of a mobile phone after being powered on includes the following steps:

① Run a boot program in an on-chip read only memory, so as to read a bootloader program from an off-chip flash memory and load the Bootloader program to an on-chip random memory.

② Run the bootloader program in the on-chip random memory to initialize an off-chip random memory.

③ Run the bootloader program in the on-chip random memory to control a coulomb meter to query power, wait, when it is queried that the battery power is lower than a starting threshold, until the battery power after charging satisfies the starting threshold, and perform the following step ④.

④ Run the bootloader program in the on-chip random memory, so as to read a system mirror from an off-chip flash memory, for example, a mainstream Android mirror, and load the system mirror to the off-chip random memory.

⑤ Run the system mirror in the off-chip random memory.

This solution has the following disadvantages:

In step ③, because the laptop computer supplies a current of 100 mA to charge the mobile phone, there exists a problem that a charging process is slow and charging waiting time is long. In addition, in the solution, the mobile phone can be started up for use only after the battery power is charged to reach a starting threshold. In a charging waiting process, the mobile phone cannot be started up, low power in the mobile phone cannot support display on an LCD, and the user cannot know whether the mobile phone has entered the charging process and cannot know a current battery power value.

SUMMARY

Embodiments of the present invention provide a low-power startup method and a user equipment, so as to solve a technical problem in the prior art that starting fails or startup waiting time is long caused due to an excessively low charging current when the user equipment which is in a power-off state due to low battery power is charged through a USB.

According to a first aspect of the present invention, a low-power startup method and provided and includes: running, by a user equipment UE, a first subprogram in a boot load program bootloader, so as to determine whether the UE is charged through a universal serial bus interface USB; if the UE is charged through the USB and battery power is lower than a starting threshold, initializing, by the UE, the USB; when the USB successfully enumerates the UE, running, by the UE, a second subprogram in the bootloader to initialize an off-chip random memory in the UE; running, by the UE, a third subprogram in the bootloader, so as to read a system mirror from an off-chip flash memory in the UE and load the system mirror to the off-chip random memory; and running, by the UE, the system mirror to complete a startup.

With reference to the first aspect, in a first possible implementation manner, the method further includes: when the battery power reaches the starting threshold, running, by the UE, the second subprogram in the bootloader to initialize the off-chip random memory in the UE; running, by the UE, the third subprogram in the bootloader, so as to read the system mirror from the off-chip flash memory in the UE and load the system mirror to the off-chip random memory; and running, by the UE, the system mirror to complete the startup.

With reference to the first aspect or the first possible implementation manner of the first aspect, in a second possible implementation manner, before the running, by a user equipment UE, a first subprogram in a boot load program bootloader, so as to determine whether the UE is charged through a universal serial bus interface USB, the method further includes: running, by the UE, a boot program to read the bootloader and load the bootloader.

With reference to the first aspect, the first possible implementation manner, or the second possible implementation manner, in a third possible implementation manner, a charging current before the successful enumeration by the USB is smaller than a charging current after the successful enumeration by the USB.

With reference to the first aspect or any one of the first possible implementation manner to the third possible implementation manner of the first aspect, in a fourth possible implementation manner, a power supply device of the USB includes: a desktop computer, a laptop computer, a netbook, a tablet computer, and a mobile phone.

According to a second aspect of the present invention, a user equipment is provided and includes: an on-chip system, an off-chip flash memory, an off-chip random memory, and a universal serial bus interface USB.

The on-chip system includes: a processor and an on-chip random memory, where the processor is configured to run a first subprogram in a boot load program bootloader, so as to determine whether the UE is charged through the USB, and the bootloader is loaded in the on-chip random memory.

If the UE is charged through the USB and battery power of the UE is lower than a starting threshold, the processor initializes the USB.

When the USB successfully enumerates the UE, the processor runs a second subprogram in the bootloader to initialize the off-chip random memory.

The processor runs a third subprogram in the bootloader to read a system mirror from the off-chip flash memory and load the system mirror to the off-chip random memory, where the system mirror is stored in the off-chip flash memory.

The processor runs the system mirror to complete a startup.

With reference to the second aspect, in a first possible implementation manner of the second aspect, the processor is further configured to:

when the battery power reaches the starting threshold, run the second subprogram in the bootloader to initialize the off-chip random memory in the UE; run the third subprogram in the bootloader, so as to read the system mirror from the off-chip flash memory in the UE and load the system mirror to the off-chip random memory; and run the system mirror to complete startup.

With reference to the second aspect or the first possible implementation manner of the second aspect, in a second possible implementation manner, the on-chip system further includes an on-chip read only memory; and the processor is further configured to: before the processor runs a first subprogram in a boot load program bootloader, so as to determine whether the UE is charged through a universal serial bus interface USB, run a boot program in the on-chip read only memory, so as to read the bootloader stored in the off-chip flash memory and load the bootloader to the on-chip random memory.

With reference to the second aspect, the first possible implementation manner, or the second possible implementation manner, in a third possible implementation manner, a charging current before the successful enumeration by the USB is smaller than a charging current after the successful enumeration by the USB.

With reference to the second aspect or any one of the first possible implementation manner to the third possible implementation manner of the second aspect, in a fourth possible implementation manner, a power supply device of the USB includes: a desktop computer, a laptop computer, a netbook, a tablet computer, and a mobile phone.

The present invention achieves the following beneficial effects:

In a low-power startup method according to embodiments of the present invention, when a UE is charged through a USB and battery power is lower than a starting threshold, the USB is first initialized, and then, only when enumeration by the USB is successful, an off-chip random memory is initialized; and further, a system mirror is loaded and the system mirror is run to complete a startup. Because a current of charging through the USB becomes a large current when the enumeration by the USB is successful, power consumption for simultaneously accessing an off-chip flash memory and the off-chip random memory is satisfied. Therefore, the startup may be implemented. In addition, because it is not necessary to perform, like the prior art, charging by using a small current until the starting threshold is satisfied, long time waiting is not needed, thereby implementing a quick startup.

DESCRIPTION OF EMBODIMENTS

Embodiments of the present invention provide a low-power startup method and a user equipment, so as to solve a technical problem in the prior art that starting fails or startup waiting time is long caused due to an excessively low charging current when the user equipment which is in a power-off state due to low battery power is charged through a USB.

The technical solutions in the embodiments of the present invention use the following general idea to solve the foregoing technical problem.

In the low-power startup method according to the embodiments of the present invention, when a UE is charged through a USB and battery power is lower than a starting threshold, the USB is first initialized, and when enumeration by the USB is successful, an off-chip random memory is initialized; and further, a system mirror is loaded and the system mirror is run to complete a startup. Because a current of charging through the USB becomes a large current when the enumeration by the USB is successful, power consumption for simultaneously accessing an off-chip flash memory and the off-chip random memory is satisfied. Therefore, the startup may be implemented. In addition, because it is not necessary to perform, like the prior art, charging by using a small current until the starting threshold is satisfied, long time waiting is not needed, thereby implementing a quick startup.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiment 1

Figure 2:
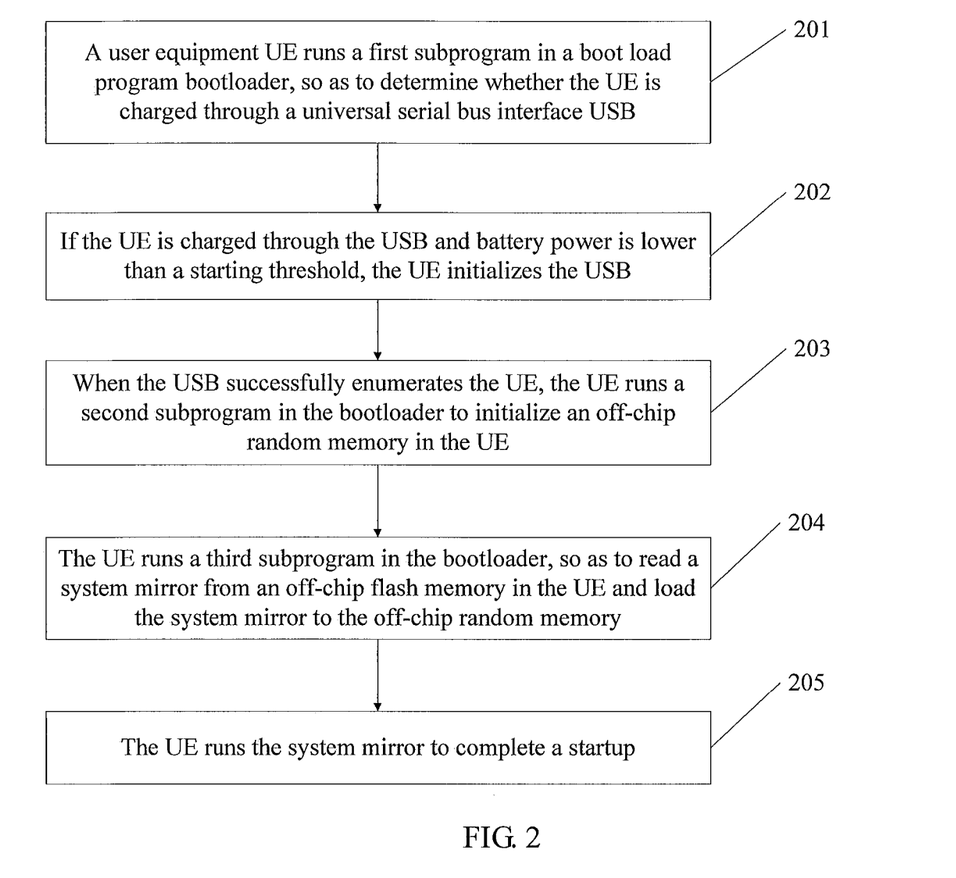
FIG. 2 is a flowchart of a low-power startup method according to an embodiment of the present invention.

Referring to FIG. 2, an embodiment of the present invention provides a low-power startup method, including:

Step 201: A user equipment UE runs a first subprogram in a boot load program bootloader, so as to determine whether the UE is charged through a universal serial bus interface USB.

Step 202: If the UE is charged through the USB and battery power is lower than a starting threshold, the UE initializes the USB.

Step 203: When the USB successfully enumerates the UE, the UE runs a second subprogram in the bootloader to initialize an off-chip random memory in the UE.

Step 204: The UE runs a third subprogram in the bootloader, so as to read a system mirror from an off-chip flash memory in the UE and load the system mirror to the off-chip random memory.

Step 205: The UE runs the system mirror to complete a startup.

In this embodiment of the present invention, the user equipment UE may be a user equipment such as a mobile phone, a tablet computer, or a digital photo frame; a power supply device of the USB may also be a user equipment of the same type as the UE, such as a mobile phone or a tablet computer in addition to a user equipment of a different type from the user equipment UE, such as a laptop computer, a desktop computer, and a netbook. Accordingly, the user equipment such as the tablet computer and the mobile phone may also serve as a primary device for supplying power to another user equipment. For example, the following may be implemented: In a case in which a mobile phone A has no power, the mobile phone A may be powered by using a mobile phone B connected, through the USB, to the mobile phone A, so that the mobile phone A can be started up; or the mobile phone A may be powered by using a tablet computer connected, through the USB, to the mobile phone A, so that the mobile phone A may be started. This embodiment of the present invention has no specific limitation on specific types of the user equipment and the power supply device of the USB.

In this embodiment of the present invention, in order to enable a first user equipment to enter a startup process, before step 201, the method further includes: running, by the UE, a boot program to read the bootloader and load the bootloader. Specifically, the UE runs the boot program in the on-chip read only memory ROM, thereby implementing reading of the bootloader from the off-chip flash memory and loading the bootloader to the on-chip random memory, as shown by arrow ① in FIG. 3. Generally, the boot program is solidified in an on-chip system SOC. Upon power-on of the boot program runs and is responsible for reading the bootloader from the off-chip flash memory. In addition, the SOC generally needs to support different hardware platforms, and adapt to flash memory components and off-chip random memory RAM components from different vendors. Therefore, generally, configurations of these components are not solidified in the on-chip ROM, but are stored in the bootloader. The off-chip flash memory may be a NAND Flash (NAND flash memory), and may also be an eMMC (Embedded Multi Media Card, embedded multimedia card). A specific location for reading the bootloader is also different as a location for storing the bootloader varies. Therefore, this embodiment of the present invention has no limitation on a type of the off-chip flash memory from which the second boot subprogram is read.

Subsequently, step 201 is performed. The UE runs the first subprogram in the boot load program bootloader, so as to determine whether the UE is charged through the universal serial bus interface USB. Specifically, for example, the first subprogram is run to detect whether a level of a certain pin of the USB interface is a high level or a low level, and hence to determine whether the UE is charged through the USB. When a determination result is yes, that is, the UE is charged through the USB, it is further determined whether the battery power of the UE is lower than the starting threshold.

Specifically, in this embodiment of the present invention, the UE runs the first subprogram in the bootloader to control the coulomb meter to query the battery power, so that the UE is capable of determining current power. After the UE determines the current power, current battery power may be determined so as to determine whether the battery power is lower than the starting threshold, as shown by arrow ② in FIG. 3. The starting threshold is set according to power consumption required during the startup process of the UE. For a different UE with a different hardware configuration, a starting threshold of the UE may not be exactly the same. A UE with a higher hardware configuration may require higher power consumption during the startup process, and therefore requires a larger starting threshold. When the battery power is lower than the starting threshold, sufficient startup power cannot be supplied, and therefore a startup fails.

Figure 3:
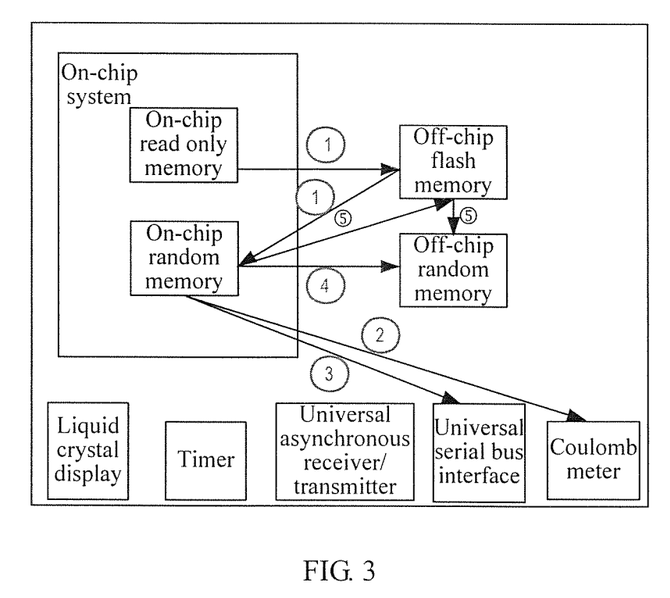
FIG. 3 is a schematic diagram of an implementation process of a low-power startup method according to an embodiment of the present invention.

When it is determined that the UE is charged through the USB and the battery power is lower than the starting threshold, step 202 is performed, and the UE initializes the USB, as shown by arrow ③ in FIG. 3.

In this embodiment of the present invention, the UE initializes the USB, so that the USB enters an enumeration process. Because charging specifications for the USB interface apply, the charging specifications for the USB comply with the USB universal serial bus specification version 2.0. When the USB interface is not in a suspended state, as long as charging through the USB is performed, a current of 100 mA may be acquired through the USB. However, after the USB successfully enumerates the UE, the UE may acquire a current of 500 mA through the USB. For USB 3.0, such specifications also apply. That is, the charging current before the successful enumeration is smaller than the charging current after the successful enumeration. Therefore, in this embodiment of the present invention, after the USB successfully enumerates the UE, the UE is capable of acquiring a large current, for example, 500 mA, satisfying power consumption for startup of the UE. Therefore, in this case, a subsequent startup procedure may be performed.

Therefore, subsequently, when the USB successfully enumerates the UE, step 302 is performed. That is, the UE runs the second subprogram in the bootloader to initialize the off-chip random memory in the UE, as shown by arrow ④ in FIG. 3.

Subsequently, the UE performs step 204. That is, the UE runs the third subprogram in the boot loader, so as to read the system mirror from the off-chip flash memory in the UE and load the system mirror to the off-chip random memory, as shown by arrow ⑤ in FIG. 3. Finally, the UE performs step 205. That is, the UE runs the system mirror in the off-chip random memory to complete the startup.

It can be seen from the foregoing description that, in this embodiment of the present invention, when a UE is charged through a USB and battery power is lower than a starting threshold, the USB is first initialized, and when enumeration by the USB is successful, an off-chip random memory is initialized; and further a system mirror is loaded and the system mirror is run to complete a startup. Because a current of charging through the USB becomes a large current when the enumeration by the USB is successful, power consumption for simultaneously accessing an off-chip flash memory and the off-chip random memory is satisfied. Therefore, the startup may be implemented. In addition, because it is not necessary to perform, like the prior art, charging by using a small current until the starting threshold is satisfied, long time waiting is not required, thereby achieving an effect of a quick startup. In addition, in a startup process, the large current may also achieve a technical effect of quickly charging a battery.

Optionally, in another embodiment of the present invention, in an enumeration process, a UE may also detect an amount of current battery power in real time. Before the UE is charged and is started up, the battery power may be not exhausted. Therefore, before successful enumeration, by means of charging using a small current, the battery power may reach a starting threshold. Therefore, when the battery power of the UE has reached the starting threshold, the UE may also continue to perform step 203 to step 205, it is unnecessary to wait until the USB successfully enumerates the UE. Therefore, it is further ensured that the UE can be quickly and successfully started up.

Figure 4:
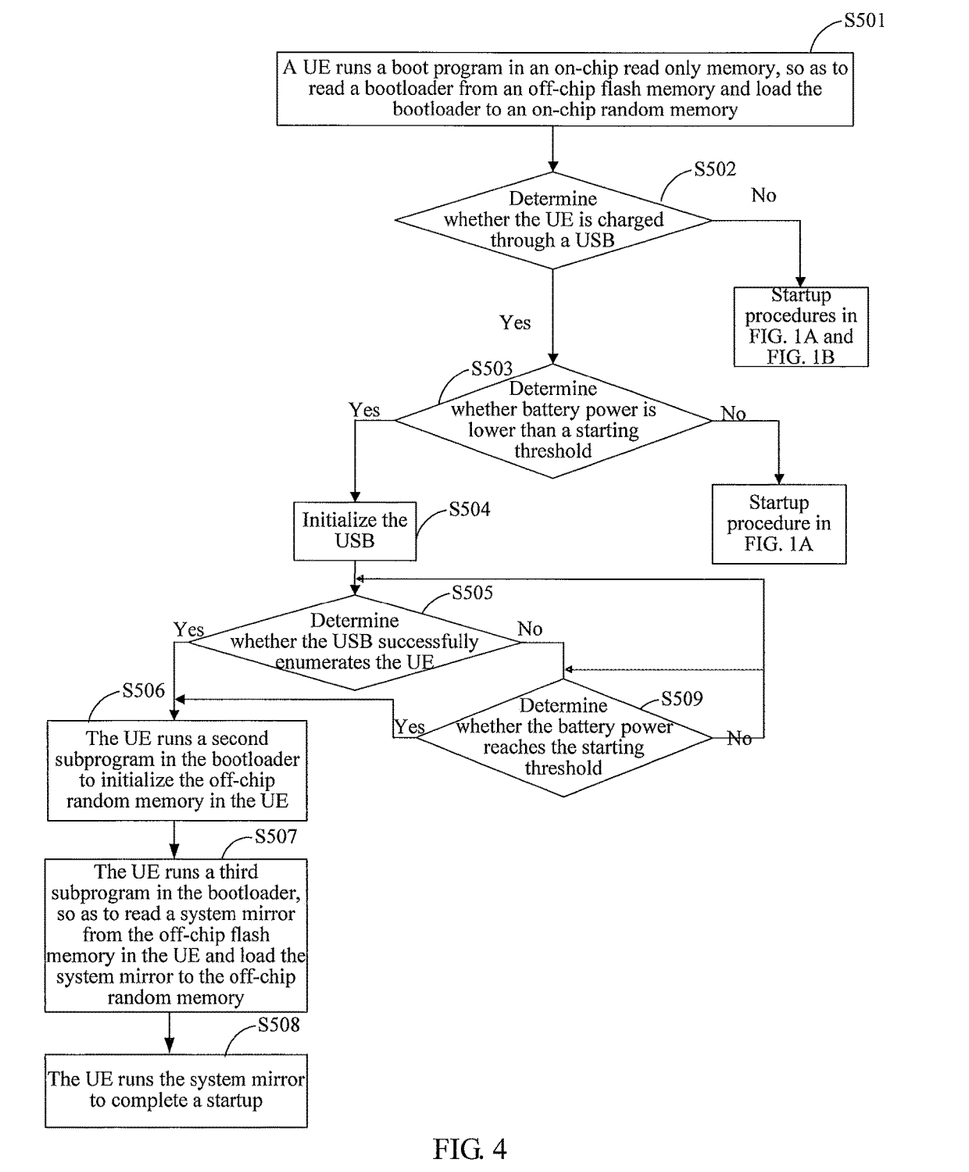
FIG. 4 is a specific working flowchart of a startup method according to an embodiment of the present invention.

The following describes in detail a specific implementation procedure of this embodiment of the present invention:

As shown in FIG. 4, a working procedure of a low-power startup method in this embodiment of the present invention includes:

S501: The UE runs a boot program in an on-chip read only memory, so as to read a bootloader from an off-chip flash memory and load the bootloader to the on-chip random memory.

S502: The UE runs a first subprogram in a boot load program bootloader to determine whether the UE is charged through a USB; when a determination result in S502 is yes, S503 is performed; and if the determination result in S502 is no, a startup procedure is performed according to the method in the prior art, that is, startup procedures shown in FIG. 1A and FIG. 1B.

S503: The UE determines whether battery power is lower than a starting threshold. Specifically, the UE queries current battery power of the UE by using a coulomb meter, and then determines whether the battery power is lower than the starting threshold. If a determination result in S503 is yes, S504 is performed; and if the determination result is no, a startup is performed according to the startup procedure shown in FIG. 1A.

S504: Initialize the USB.

S505: Determine whether the USB successfully enumerates the UE; when the enumeration is successful, perform S506 to S508; and if the enumeration is not successful, perform S509.

S506: The UE runs a second subprogram in the bootloader to initialize an off-chip random memory in the UE.

S507: The UE runs a third subprogram in the bootloader, so as to read a system mirror from an off-chip flash memory in the UE and load the system mirror to the off-chip random memory.

S508: The UE runs the system mirror to complete a startup.

S509: Determine whether the battery power reaches the starting threshold; if a determination result is yes, perform S506, and if the determination result is no, continue to perform S509 or perform S505.

Embodiment 2

Figure 5:
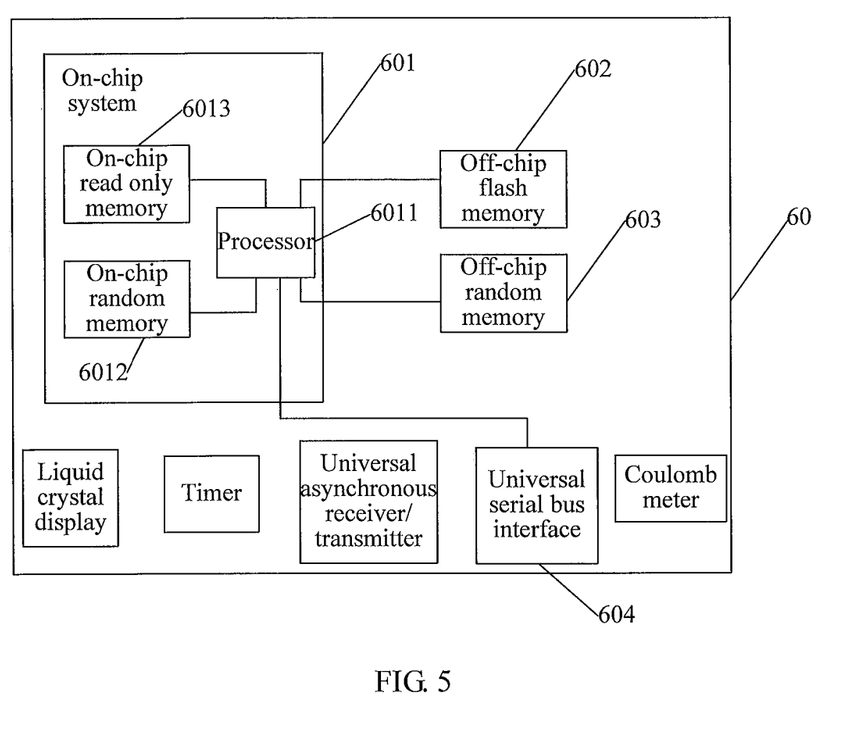
FIG. 5 is a structural diagram of a user equipment according to an embodiment of the present invention.

Referring to FIG. 5, an embodiment of the present invention provides a user equipment UE 60. The user equipment UE 60 includes: an on-chip system 601, an off-chip flash memory 602, an off-chip random memory 603, and a universal serial bus interface USB 604. The on-chip system 601 includes: a processor 6011 and an on-chip random memory 6012. The processor 6011 is configured to run a first subprogram in a boot load program bootloader, so as to determine whether the UE is charged through the USB 604, where the bootloader is loaded in the on-chip random memory 6012. If the UE is charged through the USB 604 and battery power of the UE is lower than a starting threshold, the processor 6011 initializes the USB 604. When the USB 604 successfully enumerates the UE, the processor 6011 runs a second subprogram in the bootloader to initialize the off-chip random memory 603. The processor 6011 runs a third subprogram in the bootloader, so as to read a system mirror from the off-chip flash memory 602 and load the system mirror to the off-chip random memory 603, where the system mirror is stored in the off-chip flash memory 602. The processor 6011 runs the system mirror to complete a startup.

In another embodiment, the processor 6011 is further configured to: when battery power reaches the starting threshold, run the second subprogram in the bootloader to initialize the off-chip random memory 603 in the UE; run the third subprogram in the bootloader, so as to read a system mirror from the off-chip flash memory 602 and load the system mirror to the off-chip random memory 603; and run the system mirror to complete the startup.

For example, the current battery power is detected by using a coulomb meter, and hence it is determined whether the battery power is lower than or reaches the starting threshold.

Further, the on-chip system 601 further includes an on-chip read only memory 6013; and the processor 6011 is further configured to: before the user equipment UE runs the first subprogram in the boot load program bootloader, so as to determine whether the UE is charged through the universal serial bus interface USB 604, run a boot program in the on-chip read only memory 6013, so as to read the bootloader stored in the off-chip flash memory 602 and load the bootloader to the on-chip random memory 6012.

In the foregoing embodiments, a charging current before the successful enumeration by the USB 604 is smaller than a charging current after the successful enumeration.

In the various embodiments, a power supply device of the USB 604 includes: a desktop computer, a laptop computer, a netbook, a tablet computer, and a mobile phone.

Charging specifications for the USB 604 comply with the USB universal serial bus specification versions 2.0 and 3.0.

In a practical application, the UE 60 further includes a liquid crystal display, a timer, or a universal asynchronous receiver/transmitter, and other functional components.

One or more technical solutions provided in the embodiments of the present invention achieve at least the following technical effects or advantages:

In the low-power startup method according to the embodiments of the present invention, when a UE is charged through a USB and battery power is lower than a starting threshold, the USB is first initialized, and when enumeration by the USB is successful, an off-chip random memory is initialized; and further, a system mirror is loaded and the system mirror is run to complete a startup. Because a current of charging through the USB becomes a large current when the enumeration by the USB is successful, power consumption for simultaneously accessing an off-chip flash memory and the off-chip random memory is satisfied. Therefore, the startup may be implemented. In addition, because it is not necessary to perform, like the prior art, charging by using a small current until the starting threshold is satisfied, long time waiting is not required, thereby implementing a quick startup.

Apparently, a person skilled in the art may make various modifications and variations to the present invention without departing from the spirit and scope of the present invention. Therefore, the present invention shall be construed to include these modifications and variations, provided that these modifications and variations fall within the scope of the claims and equivalent technologies of the present invention.

What is claimed is:

1. A low-power startup method comprising:
   executing, by a user equipment (UE), a first subprogram in a boot load program (bootloader) stored in an on-chip random memory, so as to determine whether the UE is charged through a universal serial bus interface (USB) before enumeration of the UE by the USB;
   upon a determination that the UE is charged through the USB and a battery power of the UE is lower than a starting threshold, initializing, by the UE, the USB so that the USB enters an enumeration process;
   after the USB successfully enumerates the UE, executing, by the UE, a second subprogram in the bootloader stored in the on-chip random memory to initialize an off-chip random memory in the UE;
   executing, by the UE, a third subprogram in the bootloader stored in the on-chip random memory, so as to read a system mirror from an off-chip flash memory in the UE and load the system mirror to the off-chip random memory; and
   executing, by the UE, the system mirror to complete a startup.

2. The method according to claim 1, further comprising:
   when the battery power reaches the starting threshold, executing, by the UE, the second subprogram in the bootloader to initialize the off-chip random memory in the UE;
   executing, by the UE, the third subprogram in the bootloader, so as to read the system mirror from the off-chip flash memory in the UE and load the system mirror to the off-chip random memory; and
   executing, by the UE, the system mirror to complete the startup.

3. The method according to claim 1, wherein before executing, by the UE, the first subprogram in the bootloader, the method further comprises:
   executing, by the UE, a boot program to read the bootloader and load the bootloader.

4. The method according to claim 1, wherein a charging current before the successful enumeration by the USB is smaller than a charging current after the successful enumeration by the USB.

5. The method according to claim 1, wherein a power supply device of the USB comprises one of: a desktop computer, a laptop computer, a netbook, a tablet computer, and a mobile phone.

6. A user equipment (UE) comprising:
   an on-chip system comprising a processor and an on-chip random memory;
   an off-chip flash memory;
   an off-chip random memory; and
   a universal serial bus interface (USB);
   wherein the processor is configured to:
      execute a first subprogram in a boot load program (bootloader) stored in the on-chip random memory, so as to determine whether the UE is charged through the USB before enumeration of the ITE by the USB, and whether the bootloader is loaded in the on-chip random memory;
      upon a determination that the UE is charged through the USB and a battery power of the UE is lower than a starting threshold, initialize the USB so that the USB enters an enumeration process;
      after the USB successfully enumerates the UE, execute a second subprogram in the bootloader stored in the on-chip random memory to initialize the off-chip random memory;
      execute a third subprogram in the bootloader stored in the on-chip random memory to read a system mirror from the off-chip flash memory and load the system mirror to the off-chip random memory, wherein the system mirror is stored in the off-chip flash memory; and
      execute the system mirror to complete a startup.

7. The user equipment according to claim 6, wherein the processor is further configured to:
   when the battery power reaches the starting threshold, execute the second subprogram in the bootloader to initialize the off-chip random memory in the UE;
   execute the third subprogram in the bootloader, so as to read the system mirror from the off-chip flash memory in the UE and load the system mirror to the off-chip random memory; and
   execute the system mirror to complete the startup.

8. The user equipment according to claim 6, wherein:
   the on-chip system further comprises an on-chip read only memory; and the processor is further configured to:
before executing the first subprogram in the bootloader, execute a boot program in the on-chip read only memory, so as to read the bootloader stored in the off-chip flash memory and load the bootloader to the on-chip random memory.

9. The user equipment according to claim 6, wherein a charging current before the successful enumeration by the USB is smaller than a charging current after the successful enumeration by the USB.

10. The user equipment according to claim 6, wherein a power supply device of the USB comprises one of: a desktop computer, a laptop computer, a netbook, a tablet computer, and a mobile phone.

11. The method according to claim 1, wherein determining whether the UE is charged through the USB comprises determining whether a level of a pin of the USB is a high level or a low level.

12. The user equipment according to claim 6, wherein determining whether the UE is charged through the USB comprises determining whether a level of a pin of the USB is a high level or a low level.

* * * * *